United States Patent [19]
Watanabe et al.

[11] Patent Number: 6,016,405
[45] Date of Patent: *Jan. 18, 2000

[54] CAMERA SYSTEM FOR REDUCING THE INFLUENCE OF VIBRATION GENERATED BY ACTUATORS

[75] Inventors: Tsuneo Watanabe, Tokyo; Ryoichi Suganuma, Yokohama; Tadao Kai, Kawasaki, all of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/385,959

[22] Filed: Feb. 9, 1995

[30]     Foreign Application Priority Data

Feb. 9, 1994  [JP]  Japan .................................. 6-015489
Aug. 22, 1994 [JP]  Japan .................................. 6-196760

[51] Int. Cl.⁷ .............................. G03B 5/00; H01L 41/08
[52] U.S. Cl. ............................ 396/55; 396/52; 396/75; 310/326
[58] Field of Search .................................... 310/321, 326, 310/327; 354/202; 348/208; 396/52–55, 72, 75

[56]     References Cited

U.S. PATENT DOCUMENTS

| 4,980,597 | 12/1990 | Iwao ........................................ 310/319 |
| 5,130,729 | 7/1992  | Sato et al. .............................. 354/202 |
| 5,282,005 | 1/1994  | Nowak et al. .......................... 355/273 |

*Primary Examiner*—Safet Metjahic
*Assistant Examiner*—Michael Dalakis

[57]            ABSTRACT

A camera having a camera system which is capable of reducing the influence that vibration generated in conjunction with driving of an actuator has on other component members of the camera system. The camera includes a lens barrel having a fixed cylinder, a focusing lens group moving mechanism, an actuator, such as an ultrasonic motor, to supply a driving force to the lens group moving mechanism, a vibration detection device to detect vibration, and a camera vibration compensation mechanism to compensate for the detected vibration. The camera system includes a component member having multiple reinforcing sections and a characteristic frequency which does not overlap with a drive frequency band of the ultrasonic motor or with the vibration frequency band of the vibration generated in conjunction with the driving of the ultrasonic motor. The component member may be a stator retaining member which supports a stator of the ultrasonic motor, or a sensor fixed cylinder which secures the vibration detection device.

24 Claims, 4 Drawing Sheets

16    16a 4a    4

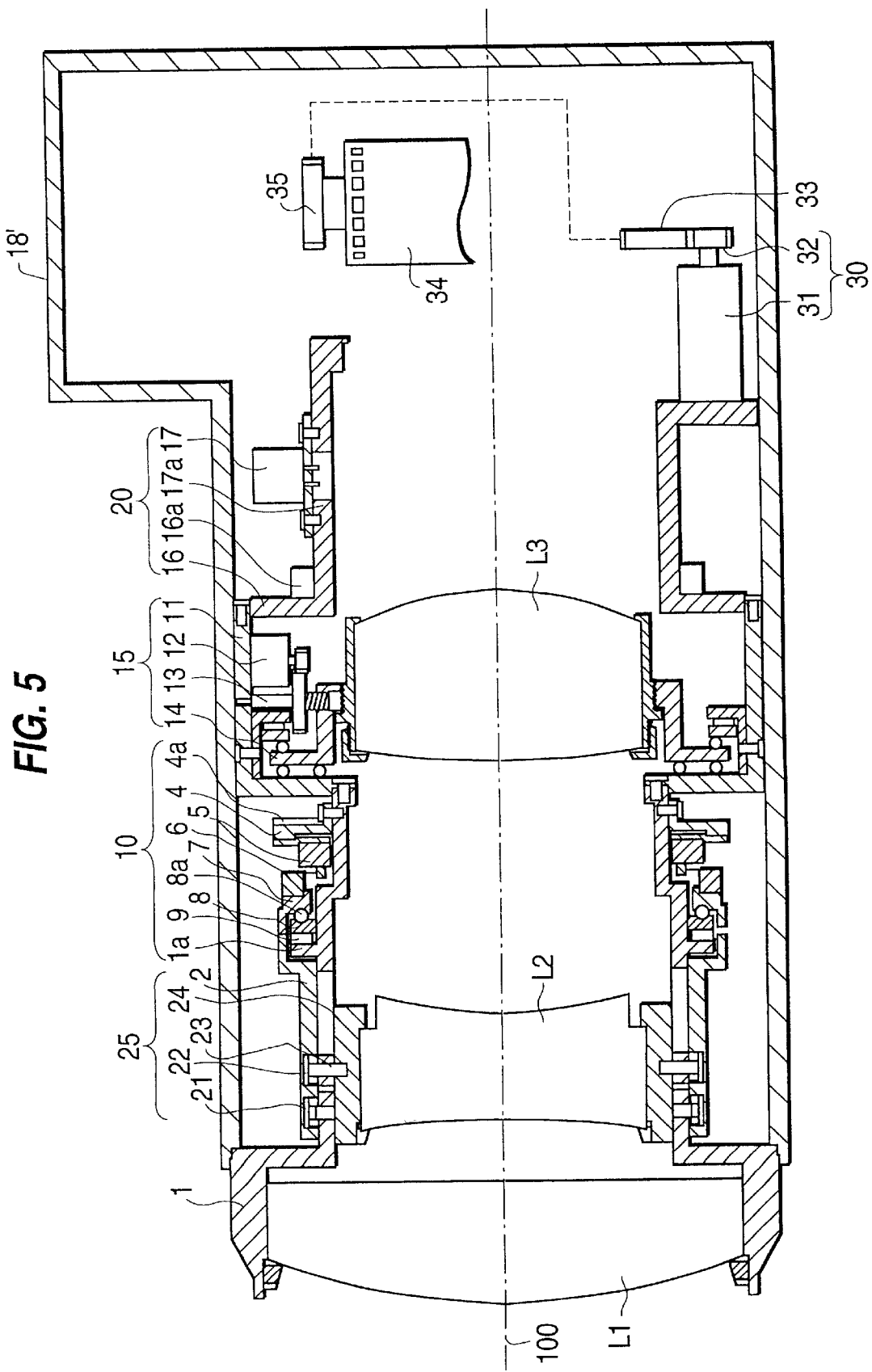

CAMERA SYSTEM FOR REDUCING THE INFLUENCE OF VIBRATION GENERATED BY ACTUATORS

BACKGROUND OF THE INVENTION

1. Field of the Invention

The present invention relates to a camera having a lens barrel and a camera body, wherein at least one of the lens barrel and the camera body include an actuator, and, more particularly, to a camera system having an actuator, such as an ultrasonic motor, which reduces or eliminates the influence of vibration generated when the actuator is driven.

2. Description of the Related Art

Camera systems are known which include actuators, such as ultrasonic motors and DC motors. The actuator may be positioned inside a lens barrel and used as a drive source for driving lenses necessary for a focusing operation, such as a zoom operation. Further, the actuator may be positioned in the camera body and used for film feed or as a drive source to drive, e.g., a mirror.

However, in the conventional type of camera system which uses actuators, vibration caused by an actuator's drive operation, which occurs in the actuator or in a member driven by the actuator, may be transmitted to other components of the camera system. For example, when the actuator is an ultrasonic motor, vibration may be transmitted to component members of the camera system which are excited by the ultrasonic wave vibrations produced by the ultrasonic motor and which are located at positions in the vicinity of the ultrasonic motor. Further, vibration may be transmitted to component members of the camera system which are mechanically connected to the ultrasonic motor. Furthermore, overlapping of the characteristic (natural) frequency of the component members of the camera system and the frequency band of the ultrasonic wave vibrations produced by the ultrasonic motor may cause abnormal noise to be generated and abnormalities to develop in camera function.

Further, in a camera system having an ultrasonic motor and including a vibration detection sensor to detect vibration, the vibration detection sensor may detect abnormal vibration because of the vibration generated in conjunction with the ultrasonic motor drive. As a result, the vibration detection accuracy may drop. Specifically, the vibration detection accuracy may drop because the frequency band of the ultrasonic wave vibration produced by the ultrasonic motor and the vibration frequency band at which the vibration detection sensor itself vibrates are extremely close at approximately 20~30 kHz. Of course, it is possible to shift the drive frequency band of the ultrasonic motor or the frequency band of the vibration detection sensor by changing the type of ultrasonic motor or vibration detection sensor used. However, it is difficult to completely keep the drive frequency band of the motor and the frequency band of the vibration detection sensor from overlapping.

SUMMARY OF THE INVENTION

It is an object of the present invention to provide a camera system having an actuator, wherein the camera system is capable of reducing the influence that vibration generated in conjunction with the driving of the actuator has on other component members of the camera system.

It is another object of the present invention to provide a camera system having an ultrasonic motor, wherein the camera system is able to reduce the adverse influence that vibration generated by driving the ultrasonic motor has on other component members of the camera system.

It is another object of the present invention to provide a camera system including an ultrasonic motor and a vibration detection device, which eliminates a drop in detection accuracy of the vibration detection device caused by the ultrasonic wave vibration generated when the ultrasonic motor is driven.

Additional objects and advantages of the invention will be set forth in part in the description which follows, and, in part, will be obvious from the description, or may learned by practice of the invention.

Objects and advantages of the present invention are achieved in accordance with embodiments of the present invention with a camera having a lens barrel and a camera body, wherein at least one of the lens barrel and the camera body includes a camera system having an actuator. The camera system includes a component member having a structure which does not resonate with the vibration generated in conjunction with the drive operation of the actuator.

When the actuator included in the lens barrel or camera body operates, vibration is generated in conjunction with the drive operation of the actuator. The vibration is transmitted to a component member which holds the actuator and to other component members of the camera system via the member which holds the actuator, causing the component members to vibrate.

In accordance with embodiments of the present invention, a component member of the camera system has a predetermined structure which will not resonate with the vibration generated in conjunction with the drive operation of the actuator. For example, when the actuator is an ultrasonic motor, a motor retaining member, which holds the ultrasonic motor, has a shape such that the characteristic frequency of the motor retaining member incorporated into the camera system does not overlap with the vibration frequency band (hereinafter referred to as the "drive frequency band") of a travelling surface wave produced by the ultrasonic motor. The component member does not resonate even if it is excited by the vibration generated by the ultrasonic motor. Further, the transmission path of the vibration is interrupted at the position of the component member, thereby reducing the vibration's influence on other component members.

The camera system may include a vibration detection device to detect vibration in the camera system, and a component member of the camera system which is positioned between the actuator and the vibration detection device in a transmission path of the vibration generated in conjunction with the drive operation of the actuator. The component member positioned between the actuator and the vibration detection device has a predetermined structure which does not resonate with the vibration generated by the actuator.

Embodiments of the present invention may be applied to a camera having a lens barrel which is removable from a camera body, or to a camera having a lens barrel formed as a unit with the camera body.

BRIEF DESCRIPTION OF THE DRAWINGS

Objects and advantages of the invention will become apparent and more readily appreciated from the following description of the preferred embodiments taken in conjunction with the accompanying drawings of which:

FIG. 5 is a cross-sectional diagram of a camera built as a unit with a lens barrel in accordance with another embodiment of the present invention.

DESCRIPTION OF THE PREFERRED EMBODIMENTS

Figure 1:
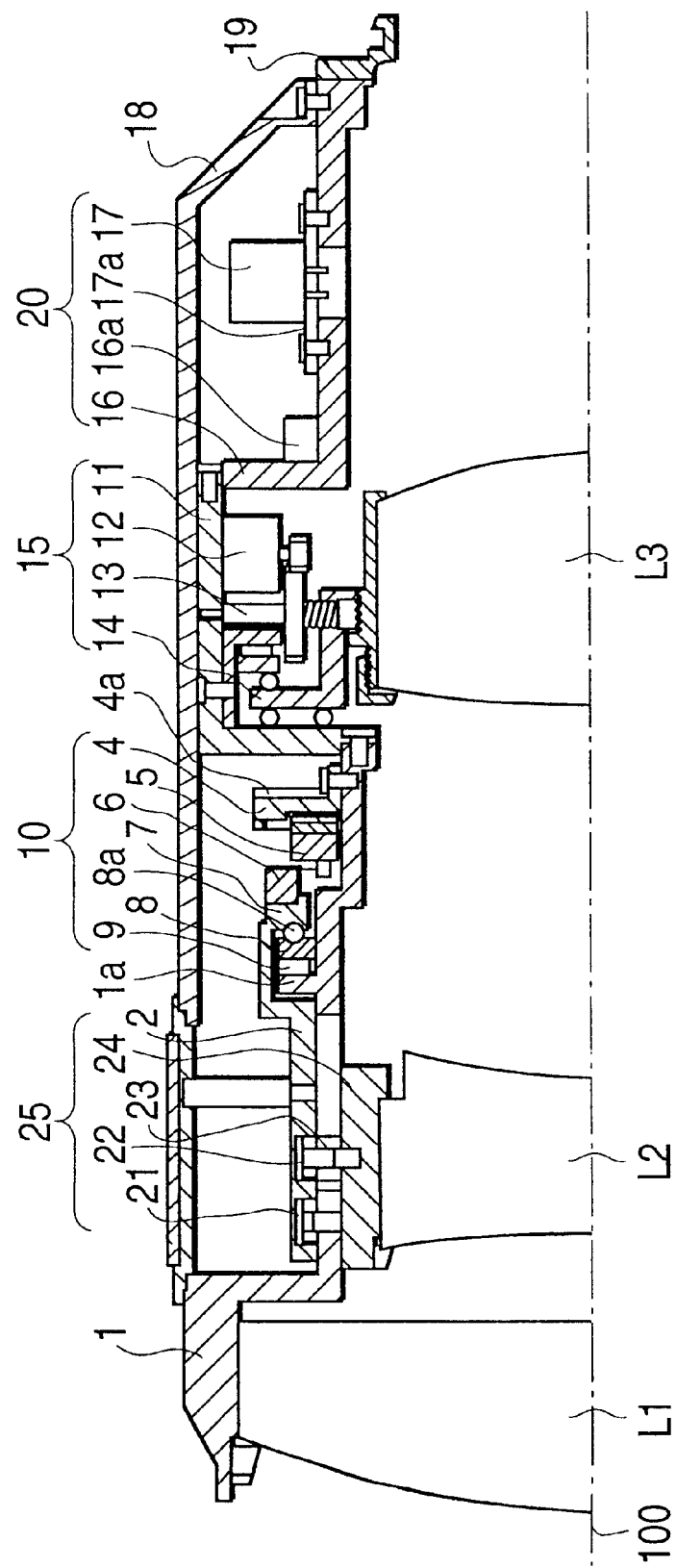
FIG. 1 is a partial cross-sectional view of a camera lens barrel in accordance with a first embodiment of the present invention.

Reference will now be made in detail to the preferred embodiments of the present invention, examples of which are illustrated in the accompanying drawings, wherein like reference numerals refer to the same or similar elements throughout.

The first embodiment of the present invention, shown in FIG. 1, is described with respect to a lens barrel including an actuator, which is preferably an ultrasonic motor, and a vibration detection device. The lens barrel also includes an optical system for forming an optical image of a subject. A camera body, into which the lens barrel may be inserted and which executes photographic operations, such as photometry and exposure, is not shown in FIG. 1.

The lens barrel shown in FIG. 1 in accordance with a first embodiment of the present invention includes, positioned along an optical axis 100, a first lens group L1, a focusing lens group L2 for performing a focusing operation, and a compensation lens group L3 for performing vibration compensation.

The lens barrel also includes a fixed cylinder 1 which holds the first lens group L1, and in which is formed a rectilinear groove for movement of the focusing lens group L2. A focusing lens group moving mechanism 25 moves the focusing lens group L2 in a direction of the optical axis 100. An ultrasonic motor 10 supplies a driving force to the focusing lens group moving mechanism 25. A vibration detection device 20 detects vibration in the lens barrel caused by factors such as hand vibration. A vibration compensation mechanism 15 compensates for the vibration based on the amount of vibration detected by the vibration detection device 20. An outer cylinder 18 is positioned at the outer circumference of the component members of the lens barrel so that it covers the component members. A bayonet claw 19 is provided for inserting the lens barrel into the camera body.

The focusing lens group moving mechanism 25 includes a lens barrel 24 to hold the focusing lens group L2; a cam ring 2 which forms a lead groove 23 and which moves the focusing lens group L2 when the lens barrel 24 is rotated; a pin 22 which fits into the lead groove 23 and passes through the rectilinear groove of the fixed cylinder 1; and a pin 21 for holding the cam ring 2 at the outer circumference of the fixed cylinder 1 so that it is able to rotate.

The ultrasonic motor 10 includes a stator retaining member 4 secured at the outer circumference of the fixed cylinder 1. A ring-shaped stator 5 is held by the stator retaining member 4 and generates travelling surface waves, and a rotor 6 is rotated on the stator 5 by the travelling surface waves. A rotor retaining member 7 rotates in unison with the rotor 6, and is supported by a ball bearing 8a and a fixed bearing member 8 so that it is able to rotate. A plate spring 9 uses the rotor retaining member 7, the ball bearing 8a and the fixed bearing 8 to apply pressure to the rotor 6 and the stator 5 in the optical axis 100 direction. The plate spring 9 limits movement in the optical axis 100 direction with a protrusion 1a formed at the outer circumference of the fixed cylinder 1.

When a travelling surface wave is produced in the stator 5 of the ultrasonic motor 10, the rotor 6, positioned on the stator 5, is rotated by the surface wave produced by the ultrasonic motor 10. The rotor 6 and the rotor retaining member 7 are attached as a unit, and the rotor retaining member 7 rotates along with the rotation of the rotor 6. The rotating force is transmitted from the rotor retaining member 7 to the cam ring 2, and, through the rotation of the cam ring 2, the focusing optical system L2 is moved in the optical axis 100 direction by movement of the lens barrel 24, thereby performing a focusing operation.

In the above-described focusing operation, when the power needed to drive the ultrasonic motor 10 is supplied, a surface wave is generated in the stator 5. The surface wave generated not only rotates the rotor 6, but it is partially transmitted to other component members, in particular, the surface wave generated vibrates other component members.

Figure 3:
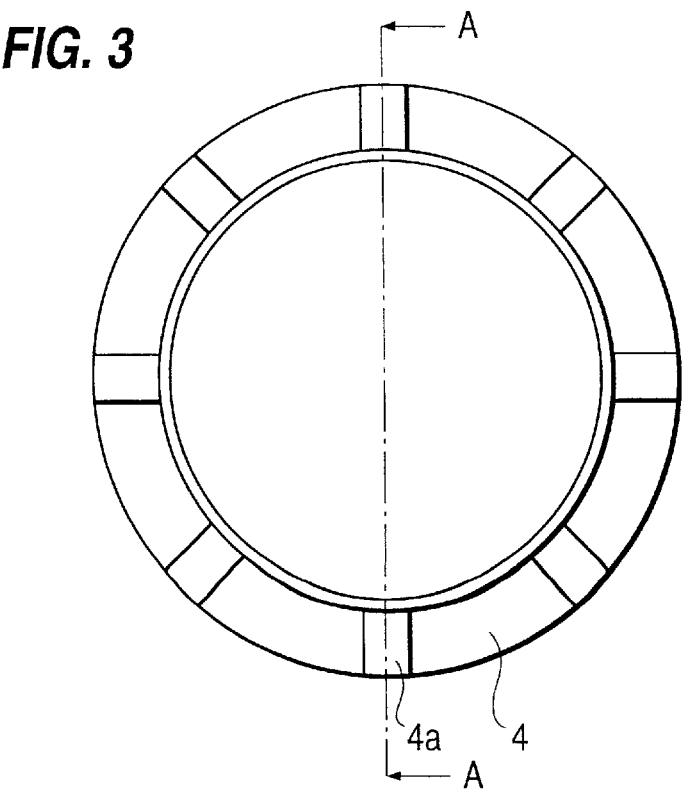
FIG. 3 is a front view of a stator retaining member seen from an optical axis direction which supports a stator of an ultrasonic motor in accordance with embodiments of the present invention.

FIG. 3 shows the stator retaining member 4 looking from the side of the lens barrel at which the bayonet claw 19 is located in the optical axis 100 direction. The stator retaining member 4 is made of aluminum, and as shown in FIG. 3, has multiple reinforcing sections 4a which are formed at its outer circumference and which protrude in the optical axis 100 direction. The structure of the stator retaining member 4, including its shape and the material with which the stator retaining member 4 is constructed, are selected such that the characteristic (natural) frequency of the stator retaining member 4 is predetermined and does not overlap with the drive frequency band of the travelling surface wave generated by the stator 5 of the ultrasonic motor 10. Further, the characteristic frequency of the stator retaining member 4 does not overlap with the frequency band of the vibration generated in conjunction with the ultrasonic motor 10 drive operation. More specifically, the characteristic frequency of the stator retaining member 4 does not overlap with the frequency of vibration generated in conjunction with the rotational motion of the rotor 6, the rotational motion of the cam ring 2, and the rectilinear motion of the lens barrel 24.

The characteristic (natural) frequency is the characteristic frequency of the component member itself or the characteristic frequency at which the component member resonates when it is incorporated into the camera system. Although the characteristic frequency may be observed, in accordance with the preferred embodiments it is computed by simulating a built-in condition using computer simulation. In accordance with embodiments of the present invention, it is not necessary to accurately compute the characteristic frequency; however, the characteristic frequency must not overlap with the drive frequency band of the ultrasonic motor 10 or with the frequency band of the vibration which accompanies the driving operation.

Further, the drive frequency described herein with respect to the preferred embodiments refers to the frequency at which the ultrasonic motor 10 itself vibrates, specifically, a frequency in the ultrasonic wave range. The vibration frequency refers to the frequency at which the component members inside the lens barrel vibrate when the component members inside the barrel are driven by an actuator (e.g., the ultrasonic motor 10). In particular, the vibration frequency refers to the vibration generated by the rotational motion of the rotor 6, the rotational motion of the cam ring 2 and the rectilinear motion of the lens barrel 24, which vibration is not limited to the ultrasonic wave range.

Since the stator retaining member 4 has the above-described type of structure, the stator retaining member 4 can be prevented from resonating as a result of the ultrasonic wave vibration generated by the ultrasonic motor 10, and the vibration can be prevented from being transmitted to other component members of the camera system.

The rotor retaining member 7 of the ultrasonic motor 10 is connected to the end of the cam ring 2 at the outer circumference of the fixed cylinder 1. Through this structure, the rotational driving force generated by the ultrasonic motor 10 is transmitted to the focusing lens group moving mechanism 25 via the cam ring 2. The cam ring 2 and the rotor retaining member 7 have a mutually linked connecting structure for transmitting the driving force generated by the ultrasonic motor 10. For example, a key/key groove structure is generally used as the connecting structure.

The vibration compensation mechanism 15 in the lens barrel includes a DC motor 12 with which feedback control of a drive amount is performed based on the vibration detected by the vibration detection device 20, as will be explained in detail below. The compensation lens group L3 is held by a compensation lens retaining member 14. A lead screw 13 displaces the compensation lens group L3 in a direction perpendicular to the optical axis 100 when it is driven by the DC motor 12. A compensation lens fixed cylinder 11 contains the components of the vibration compensation mechanism 15 as a unit.

The vibration compensation mechanism 15 also includes a second DC motor, lead screw, and compensation retaining member (not shown in the figure), which are contained by the compensation lens fixed cylinder 11, and which have the same structure as the components described above. The lead screw of the second set of vibration compensation components displaces the compensation lens group L3 in a direction perpendicular to the direction of displacement by the lead screw 13 in a plane perpendicular to the optical axis 100. Through the above-described configuration, the vibration compensation mechanism 15 is able to displace the compensation lens group L3 in a plane perpendicular to the optical axis 100 according to the vibration detected by the vibration detection device 20 to optically compensate for image vibration caused by camera vibration.

The vibration detection device 20 includes a vibration detection sensor 17 to detect vibration in the lens barrel caused by camera vibration. A sensor retaining member 17a holds the vibration detection sensor 17, and a sensor fixed cylinder 16 secures the sensor retaining member 17a. Connection holes are formed in the sensor retaining member 17a below the vibration detection sensor 17 to secure the vibration detection sensor 17 to the sensor fixed cylinder 16. Further, in the same manner as described with respect to the vibration compensation mechanism 15, the vibration detection device 20 includes a second set of components (not shown) which are identical to those described above and are arranged so that they are mutually perpendicular in a plane which is perpendicular to the optical axis 100.

In accordance with preferred embodiments of the present invention, the vibration detection sensor 17 is an angular velocity sensor which uses a gyroscope. However, the vibration detection sensor 17 is not limited to an angular velocity sensor using a gyroscope. For example, other types of angular velocity sensors may be used, or other types of sensors may be used, as long as the sensor is able to detect lens barrel vibration.

Figure 2:
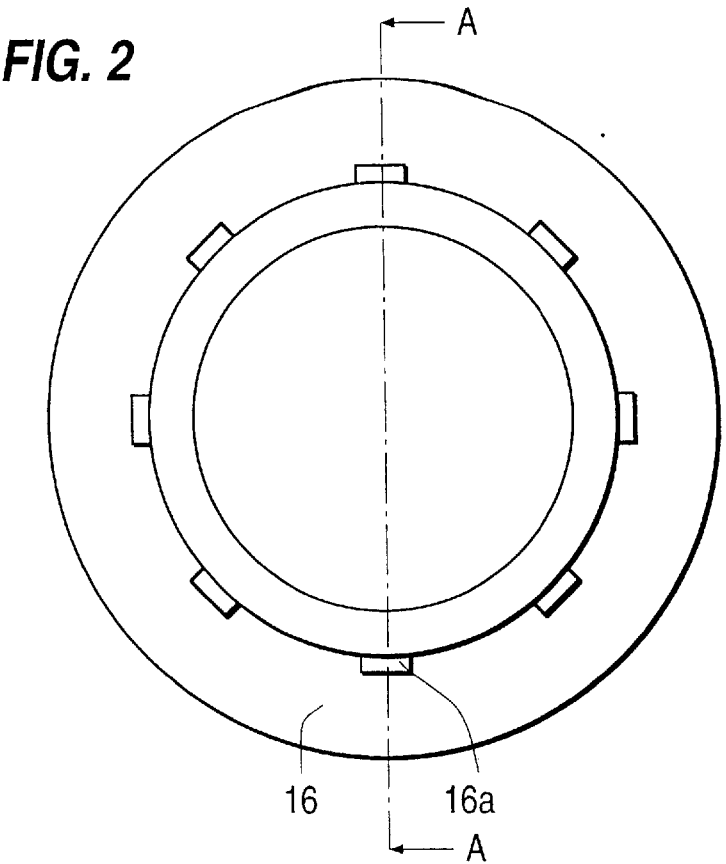
FIG. 2 is a front view of a sensor fixed cylinder seen from an optical axis direction which supports a camera vibration detection sensor in accordance with embodiments of the present invention.

FIG. 2 is a view of the sensor fixed cylinder 16 seen from the side of the lens barrel at which the bayonet claw 19 is located in the optical axis 100 direction. The sensor fixed cylinder 16 is made of aluminum, and, as shown in FIG. 2, the sensor fixed cylinder 16 has multiple reinforcing sections 16a formed at its outer circumference which protrude in the optical axis 100 direction. The structure of the sensor fixed cylinder 16, including its shape and the materials with which the sensor fixed cylinder 16 is constructed, are selected such that the characteristic frequency of the sensor fixed cylinder 16 is predetermined and does not overlap with the drive frequency band of the ultrasonic motor 10, or with the frequency band of the vibration generated in conjunction with the ultrasonic motor 10 drive operation. Specifically, the characteristic frequency of the sensor fixed cylinder 16 does not overlap with the vibration generated by the rotational motion of the rotor 6, the rotational motion of the cam ring 2, and the rectilinear motion of the lens barrel 24. Further, the characteristic frequency of the sensor fixed cylinder 16 does not overlap with the frequency band of the vibration generated in conjunction with the driving of the vibration compensation mechanism 15, specifically, the vibration generated in conjunction with the rotational motion of the DC motor 12, and the rectilinear motion of lens group L3 and retaining member 14.

The structure of the sensor fixed cylinder 16 makes it possible to prevent the sensor fixed cylinder 16 from resonating as a result of the ultrasonic wave vibration generated by the ultrasonic motor 10, and to prevent the vibration from reaching the vibration detection sensor 17. The structure of the sensor fixed cylinder 16 also prevents vibration noise generated in conjunction with the rectilinear motion of the focusing lens group L2 or the rectilinear motion of the vibration compensation lens group L3 from reaching the vibration detection sensor 17. In accordance with the first embodiment of the present invention, since the characteristic frequency of the stator retaining member 4 does not overlap with the drive frequency band of the ultrasonic motor 10, the stator retaining member 4 does not resonate with the surface wave generated by the ultrasonic motor 10. Accordingly, unnecessary transmission of the ultrasonic wave vibration of the ultrasonic motor 10 to other component members can be reduced.

Further, when travelling surface waves are generated which are not prevented from being transmitted to other component members by the stator retaining member 4, and vibration noise is produced in the lens barrel components accompanying the rectilinear motion of the focusing lens group L2 and the rectilinear motion of the compensation lens group L3, the transmission of unnecessary vibration to the vibration detection sensor 17 is prevented by the sensor fixed cylinder 16.

Thus, in accordance with the first embodiment of the present invention, abnormal noise and other abnormalities caused by unwanted vibration may be prevented by blocking the transmission of the ultrasonic wave vibrations of the ultrasonic motor 10 to other component members with the stator retaining member 4. Moreover, in accordance with the first embodiment, the transmission of unwanted vibration to the vibration detection sensor 17 may be prevented by the sensor fixed cylinder 16, thus improving the detection accuracy of the vibration detection sensor 17 by eliminating the influence of unwanted vibration on the vibration detection sensor 17.

Figure 4:
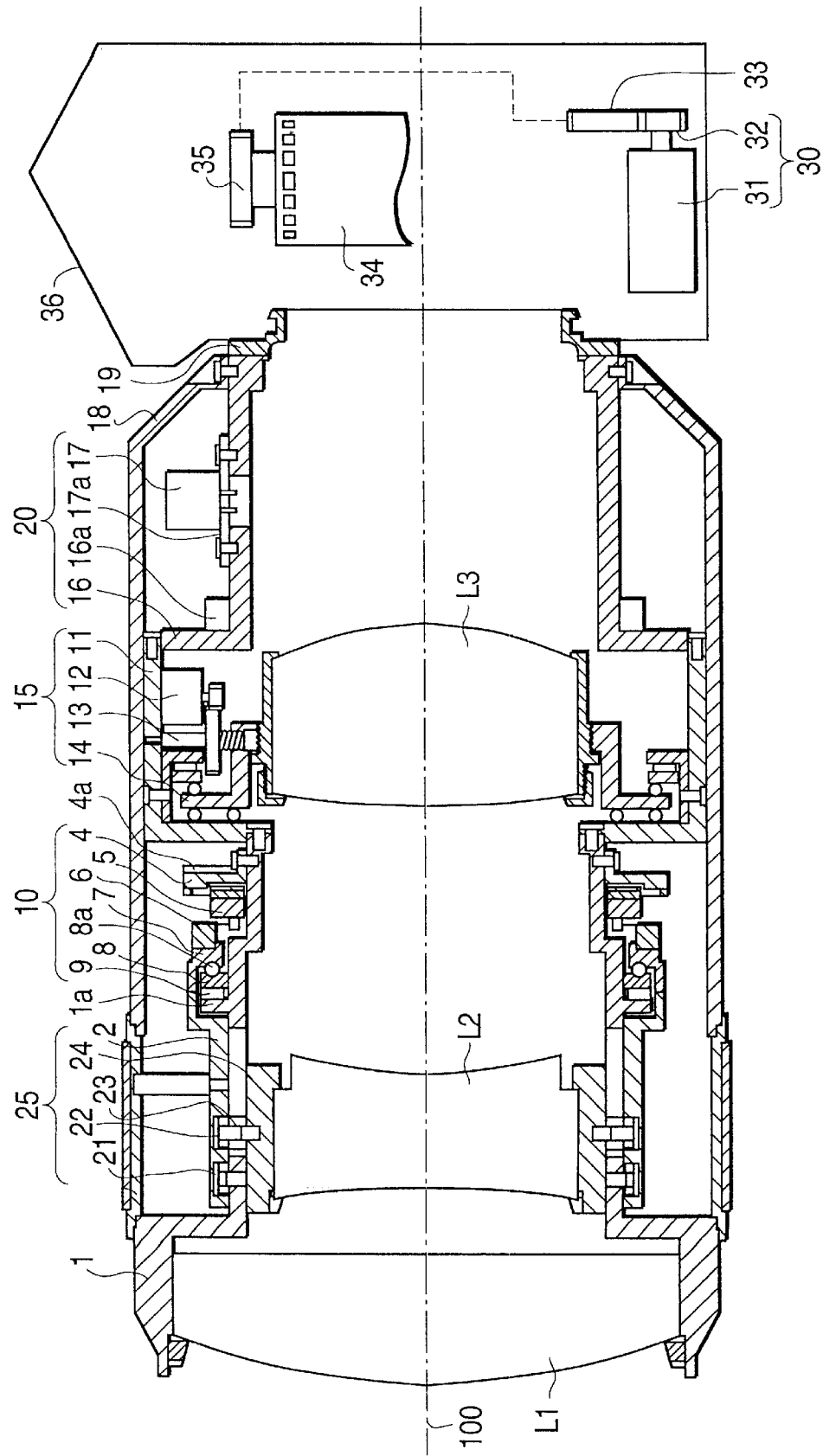
FIG. 4 is a cross-sectional view of a lens barrel and a camera body in accordance with another embodiment of the present invention.

FIG. 4 shows a second embodiment of the present invention. The second embodiment is applied to a camera which includes a vibration detection device located inside a lens barrel, and an actuator, such as an ultrasonic motor, in both the lens barrel and a camera body.

As shown in FIG. 4, the second embodiment of the present invention comprises a lens barrel having the same structure as the lens barrel described above the first embodiment and shown in FIG. 1. The lens barrel is inserted into a camera body. In FIG. 4, like reference numerals are used to refer to elements which are the same as those shown in FIG. 1. Accordingly, in the following description of the second embodiment, a description of the lens barrel will not be repeated here because the description is the same as that of the first embodiment described above.

The camera body includes a photographic device (not shown) to execute photographic operations, such as photometry and exposure. A film feed mechanism performs winding of film 34 to expose an optical image obtained by the photographic device. The film feed mechanism includes a film support device 35 to support the film 34 so that the film is able to rotate. An ultrasonic motor 30 serves as an actuator to drive the film feed mechanism. A driving force transmission mechanism 33, positioned between the film feed mechanism and the ultrasonic motor 30, transmits driving force to the film feed mechanism. An enclosure 36 houses the above-described components.

In accordance with the second embodiment of the invention, the ultrasonic motor 30 in the camera body includes a motor main unit 31 and a drive gear 32 to output the driving force of the motor 30. The driving force generated by the motor 30 drives the film feed mechanism via the drive gear 32 and the driving force transmission mechanism 33.

The focusing operation of the ultrasonic motor 10 and the focusing lens group moving mechanism 25, and the vibration compensation operation of the vibration detection device 20 and the vibration compensation mechanism 15 are performed in the same manner as described above with respect to the first embodiment.

In accordance with the second embodiment of the invention, there is a possibility that unwanted vibration, influencing the vibration detection accuracy of the vibration detection sensor 17, will be generated by both the ultrasonic motor 10 in the lens barrel and by the ultrasonic motor 30 in the camera body. For example, there is a possibility that the ultrasonic wave vibration generated by a stator (not shown) of the ultrasonic motor 30 in the camera body and the vibration of a gear reduction system (not shown) or its peripheral members, which is generated by the driving of the film feed mechanism, will reach the vibration detection sensor 17 via the enclosure 36 and the bayonet claw 19.

In accordance with the second embodiment of the present invention, to prevent this type of vibration from reaching the vibration detection sensor 17, a sensor fixed cylinder 16 which secures the vibration detection sensor 17 is employed in a manner similar to that described above with respect to the first embodiment (see FIG. 2). The sensor fixed cylinder 16 has multiple reinforcing sections 16a formed at its outer circumference which protrude in the optical axis 100 direction. The characteristic frequency of the sensor fixed cylinder 16 does not overlap with the drive frequency band of the ultrasonic wave vibration generated by the respective stators of the ultrasonic motor 10 and the ultrasonic motor 30. Further, the characteristic frequency of the sensor fixed cylinder 16 does not overlap with the frequency band of the vibration generated in conjunction with driving of components by the ultrasonic motor 10 or ultrasonic motor 30. Specifically, the vibration generated in conjunction with the rectilinear motion of the focusing lens group L2 or with the film feed motion.

Through the above-described operation, in accordance with the second embodiment of the present invention, the sensor fixed cylinder 16 prevents resonance caused by the ultrasonic wave vibration generated by ultrasonic motor 10 and ultrasonic motor 30. Further, resonance caused by the vibration generated in conjunction with the rectilinear motion of the focusing lens group L2 or generated in conjunction with the film feed motion is also prevented from reaching the vibration detection sensor 17.

The second embodiment of the present invention has been described as using an ultrasonic motor in a feed mechanism which winds the film; however, the second embodiment of the present invention is not limited to an ultrasonic motor used as a film feed mechanism. For example, the second embodiment of the present invention can be applied to a camera system using an ultrasonic motor for such functions as shutter drive, mirror drive, etc.

The second embodiment of present invention may be applied to a camera in which the lens barrel and the camera body may be separated, and to a camera in which the camera body is built as a unit with a lens barrel.

Next, with reference to FIG. 5, a third embodiment of the present invention will be described. The third embodiment of the present invention is applied to a camera which is built as a unit with a lens barrel. The elements of the third embodiment, shown in FIG. 5, which are the same as those described above with respect to the first and second embodiments are referred to with like reference numerals, and a detailed description of these components will not be repeated.

In accordance with the third embodiment of the present invention, the component elements inside the camera body are housed inside an enclosure 18'. Because the lens barrel is formed as a unit with the camera body, there is the possibility that the ultrasonic wave vibration generated by the stator (not shown) of the ultrasonic motor 30 located in the camera body and the vibration of a reduction gear system (not shown) or its peripheral members, which is generated by the driving of the film feed mechanism, will reach the vibration detection sensor 17 via the enclosure 18'.

In accordance with the third embodiment of the invention, to prevent this type of unwanted vibration from reaching the vibration detection sensor 17, the sensor fixed cylinder 16 has the type of structure described above with reference to FIG. 2, so that the fixed cylinder 16 can be prevented from resonating through the ultrasonic wave vibration generated in conjunction with the ultrasonic wave vibration of the ultrasonic motor 30 and with the film feed motion.

Although embodiments of the present invention has been described with respect to a stator retaining member 4 and a sensor fixed cylinder 16 to eliminate the influence of certain vibration, the principals of the present invention can be applied in a similar manner to other component members comprising the camera system. For example, the rotor retaining member 7 or the sensor retaining member 17a may be constructed to have a predetermined characteristic frequency such that the influence of vibration on camera components is eliminated.

In accordance with embodiments of the present invention, a structure has been described in which protruding reinforcing sections 4a and 16a are made of aluminum and are circularly arranged at the outer circumference of the stator retaining member 4 and the sensor fixed cylinder 16, respectively. However, the present invention is not limited to the structure and materials described with respect to the above embodiments. For example, the structure, thickness and materials of the sections 4a and 16a may be changed as long as the characteristic frequency of the sections 4a and 16a does not overlap with the frequency band of the vibration generated by the ultrasonic motor 10 used in the camera system.

In accordance with embodiments of the present invention, both the ultrasonic motor 10 and the vibration detection sensor 17 are located inside the lens barrel; however, the present invention is not limited to this structure and the ultrasonic motor 10 and the camera vibration detection sensor 17 may be attached at other desired locations in the camera.

In accordance with embodiments of the present invention, the DC motor 12 was described as an example of an actuator for the compensation lens group L3. The embodiments of the present invention are not limited to a DC motor as an actuator for the lens group L3, and the actuator for lens group L3 may also be an ultrasonic motor.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera system, comprising:
    an actuator to perform a drive operation; and
    a component member positioned in a transmission path of vibration generated by the actuator, the component member having a characteristic frequency that does not overlap with a drive frequency band of the actuator and does not overlap with a frequency band of vibration accompanying the drive operation, such that the vibration generated by the drive operation of the actuator does not cause the component member to resonate.

2. A camera system as recited in claim 1, wherein the actuator comprises an ultrasonic motor having a drive frequency band, and the component member has a predetermined characteristic frequency, when incorporated into the camera system, which differs from the drive frequency band of the ultrasonic motor.

3. A camera system as recited in claim 2, wherein the predetermined characteristic frequency differs from a frequency band of vibration generated in conjunction with a drive operation of the ultrasonic motor.

4. A camera system as recited in claim 1, further comprising a vibration detection device, wherein the component member is positioned in a transmission path of vibration transmitted from the actuator to the vibration detection device.

5. A camera system as recited in claim 4, wherein the camera system is provided in at least one of a lens barrel and a camera body.

6. A camera system as recited in claim 1, further comprising:
    a vibration detection device including a vibration detection sensor and a sensor retaining member to hold the vibration detection sensor; and
    a securing member to secure the vibration detection device,
    wherein the sensor retaining member secures the vibration detection sensor to the securing member, and the component member is at least one of the securing member and the sensor retaining member.

7. A camera system as recited in claim 6, wherein the securing member is circular and has multiple reinforcing sections formed at its outer circumference.

8. A camera system as recited in claim 2, wherein the ultrasonic motor includes
    a stator to generate a surface wave for the drive operation,
    a stator retaining member to hold the stator,
    a rotor which is driven by the surface wave,
    a rotor retaining member to retain the rotor,
    and wherein the component member is at least one of the stator retaining member and the rotor retaining member.

9. A camera system as recited in claim 8, wherein the stator retaining member is circular and has multiple reinforcing sections formed at its outer circumference.

10. A camera system as recited in claim 1, wherein the shape of the component member is selected such that the characteristic frequency of the component member does not overlap with a drive frequency band of a travelling wave generated by the actuator.

11. A camera system as recited in claim 1, wherein the material of the component member is selected such that the characteristic frequency of the component member does not overlap with a drive frequency band of a travelling wave generated by the actuator.

12. A camera system provided in at least one of a lens barrel and a camera body, comprising:
    an actuator to perform a drive operation;
    a vibration detection device to detect vibration in the camera system; and
    a component member positioned in a transmission path of vibration transmitted from the actuator to the vibration detection device, the vibration being generated in conjunction with the drive operation of the actuator, the component member having a characteristic frequency that does not overlap with a drive frequency band of the actuator and does not overlap with a frequency band of vibration accompanying the drive operation, such that the component member does not resonate with vibration generated by the drive operation of the actuator.

13. A camera system as recited in claim 12, wherein the actuator comprises an ultrasonic motor having a drive frequency band, and the component member has a predetermined characteristic frequency, when incorporated into the camera system, which differs from the drive frequency band of the ultrasonic motor.

14. A camera system as recited in claim 13, wherein the predetermined characteristic frequency is different from the frequency band of the vibration generated in conjunction with the drive operation of the ultrasonic motor.

15. A camera system as recited in claim 14, wherein the vibration detection device includes a vibration detection sensor and a securing member to secure the vibration detection sensor to one of the lens barrel and the camera body, and the component member is the securing member.

16. A camera system as recited in claim 13, wherein the ultrasonic motor includes
    a stator to generate a surface wave for a driving operation,
    a stator retaining member to hold the stator,
    a rotor which is driven by the surface wave,
    a rotor retaining member to retain the rotor,
    and wherein the component member is at least one of the stator retaining member and the rotor retaining member.

17. A camera including a lens barrel and a camera body, comprising:
- an actuator, provided in at least one of the lens barrel and the camera body, to perform a drive operation;
- a component member positioned in a transmission path of vibration transmitted to the vibration detection device, the vibration being generated in conjunction with the drive operation of the actuator, the component member having a characteristics frequency that does not overlap with a drive frequency band of the actuator and does not overlap with a frequency band of vibration accompanying the drive operation such that the component member does not resonate with vibration generated by the drive operation of the actuator.

18. A lens barrel, comprising:
- an actuator to perform a drive operation;
- a vibration detection device to detect vibration in the lens barrel; and
- a component member positioned in a transmission path of vibration transmitted to the vibration detection device, the vibration being generated in conjunction with the drive operation of the actuator, the component member having a characteristic frequency that does not overlap with a drive frequency band of the actuator and does not overlap with a frequency band of vibration accompanying the drive operation, such that the component member does not resonate with vibration generated by the drive operation of the actuator.

19. A camera including a camera body built as a unit with a lens barrel, comprising:
- an actuator to perform a drive operation;
- a vibration detection device to detect vibration in the camera; and
- a component member positioned in a transmission path of vibration transmitted to the vibration detection device the vibration being generated in conjunction with the drive operation of the actuator, the component member having a characteristic frequency that does not overlap with a drive frequency band of the actuator and does not overlap with a frequency band of vibration accompanying the drive operation, such that the component member does not resonate with vibration generated by the drive operation of the actuators.

20. A camera as recited in claim 19, wherein the actuator comprises an ultrasonic motor having a drive frequency band, and the component member has a predetermined characteristic frequency, when incorporated into the camera, which differs from the drive frequency band of the ultrasonic motor.

21. A camera as recited in claim 20, wherein the predetermined characteristic frequency differ from a frequency band of the vibration generated in conjunction with the drive operation of the ultrasonic motor.

22. A camera as recited in claim 21, wherein the vibration detection device includes a vibration detection sensor and a securing member to secure the vibration detection sensor, and the component member is the securing member.

23. A camera as recited in claim 21, wherein the ultrasonic motor includes
- a stator to generate a surface wave for a driving operation;
- a stator retaining member to hold the stator;
- a rotor which is driven by the surface wave, and
- a rotor retaining member to hold the rotor driven by the surface wave,
- and wherein the component member is at least one of the stator retaining member and the rotor retaining member.

24. A camera including a lens barrel built as a unit with a camera body, comprising:
- an actuator to perform a drive operation; and
- a component member having a characteristic frequency that does not overlap with a drive frequency band of the actuator and does not overlap with a frequency band of vibration accompanying the drive operation, such that the component member does not resonate with vibration generated in conjunction with the drive operation of the actuator, the component member being positioned in a transmission path of vibration generated in conjunction with the drive operation of the actuator.

* * * * *

UNITED STATES PATENT AND TRADEMARK OFFICE
CERTIFICATE OF CORRECTION

PATENT NO.: 6,016,405
DATED : January 18, 2000
INVENTOR(S): Tsuneo Watanabe, et al.

It is certified that error appears in the above-identified patent and that said Letters Patent is hereby corrected as shown below:

Column 12, line 3, (claim 19), change "actuators" to --actuator--.

Signed and Sealed this

Thirtieth Day of January, 2001

Attest:

Q. TODD DICKINSON

Attesting Officer

Director of Patents and Trademarks